(12) United States Patent
Herzig et al.

(10) Patent No.: US 11,174,024 B2
(45) Date of Patent: Nov. 16, 2021

(54) AIRCRAFT PYLON

(71) Applicant: ISRAEL AEROSPACE INDUSTRIES LTD., Lod (IL)

(72) Inventors: Yoav Herzig, Ein Sarid (IL); Daniel Marom, Petach Tikva (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 360 days.

(21) Appl. No.: 16/470,429

(22) PCT Filed: Dec. 27, 2017

(86) PCT No.: PCT/IL2017/051389
§ 371 (c)(1),
(2) Date: Jun. 17, 2019

(87) PCT Pub. No.: WO2018/122843
PCT Pub. Date: Jul. 5, 2018

(65) Prior Publication Data
US 2020/0010195 A1 Jan. 9, 2020

(30) Foreign Application Priority Data
Dec. 28, 2016 (IL) .......................... 249908

(51) Int. Cl.
*B64D 1/06* (2006.01)
*B64D 7/08* (2006.01)
(Continued)

(52) U.S. Cl.
CPC ................... *B64D 1/06* (2013.01); *B64C 1/26* (2013.01); *B64D 7/08* (2013.01); *B64D 9/00* (2013.01)

(58) Field of Classification Search
CPC .... B64C 5/12; B64C 9/02; B64C 9/36; B64D 9/00; B64D 1/06; B64D 1/04; B64D 1/08; B64D 7/08; B64D 1/10
See application file for complete search history.

(56) References Cited

U.S. PATENT DOCUMENTS 2,071,594 A 2/1937 Trimbach
2,829,561 A 4/1958 Granfelt
(Continued)

FOREIGN PATENT DOCUMENTS

DE 2314296 A1 9/1974
EP 2933185 A1 10/2015
(Continued)

OTHER PUBLICATIONS

International Search Report and Written Opinion from International Application No. PCT/IL2017/051389 dated Mar. 14, 2018.

*Primary Examiner* — Richard R. Green
*Assistant Examiner* — Madison Elizabeth Dittner
(74) *Attorney, Agent, or Firm* — Marcus S. Simon

(57) ABSTRACT

An aircraft pylon is provided, configured for mounting to the underside of an aircraft wing projecting from a fuselage and for carrying an external payload suspended therefrom. The pylon comprises an attachment mechanism configured for facilitating mounting of the pylon to the aircraft wing, and a carrying arrangement configured for carrying the payload and being pivotally articulated to the attachment mechanism. The pylon is configured to selectively pivot the carrying arrangement about a pylon axis between a vertical position in which it is suspended in a substantially vertical orientation, and a tilted position in which it is tilted toward the fuselage.

19 Claims, 5 Drawing Sheets

(51) Int. Cl.
 *B64D 9/00* (2006.01)
 *B64C 1/26* (2006.01)

(56) References Cited

U.S. PATENT DOCUMENTS

| | | | |
|---|---|---|---|
| 3,188,025 | A | 6/1965 | Moorehead |
| 3,327,965 | A | 6/1967 | Bockrath |
| 4,616,793 | A | 10/1986 | Hassler |
| 4,637,292 | A * | 1/1987 | Peterson .................. B64D 7/08 89/1.804 |
| 4,781,342 | A | 11/1988 | Hardy et al. |
| 5,092,542 | A | 3/1992 | Ellis et al. |
| 5,257,758 | A | 11/1993 | Hassel |
| 7,083,148 | B2 * | 8/2006 | Bajuyo .................... B64D 1/04 244/137.4 |
| 7,503,525 | B1 | 3/2009 | Lam et al. |
| 7,946,208 | B1 * | 5/2011 | Howard .................. B64D 1/04 89/1.57 |
| 2007/0241228 | A1 | 10/2007 | Haynes et al. |
| 2008/0302234 | A1 | 12/2008 | Dortch et al. |
| 2009/0294580 | A1 | 12/2009 | Sammito et al. |
| 2010/0019081 | A1 | 1/2010 | Cazals et al. |
| 2012/0199699 | A1 | 8/2012 | Isaac et al. |
| 2013/0221154 | A1 | 8/2013 | Vander et al. |
| 2013/0221158 | A1 | 8/2013 | Binkholder et al. |
| 2014/0263855 | A1 | 9/2014 | Ross et al. |
| 2015/0122943 | A1 | 5/2015 | Wu et al. |

FOREIGN PATENT DOCUMENTS

| | | |
|---|---|---|
| JP | 2005181266 A | 7/2005 |
| WO | 2009130690 A2 | 10/2009 |
| WO | 2015145426 A1 | 10/2015 |

* cited by examiner

AIRCRAFT PYLON

TECHNOLOGICAL FIELD

The presently disclosed subject matter relates to an aircraft pylon in general and in particular to an aircraft pylon having a suspension mechanism.

BACKGROUND

An aircraft pylon is a suspension device externally installed on an aircraft, typically under the wing thereof. The aircraft pylon provides means of externally attaching fuel tanks, or other external payloads to the aircraft.

Aircraft pylons may affect aerodynamic characteristics of the aircraft, such as lift, drag, etc. Pylons may be designed to mitigate the aerodynamic effects.

SUMMARY

According to one aspect of the presently disclosed subject matter, there is provided an aircraft pylon for mounting to the underside of an aircraft wing projecting from a fuselage and for carrying an external payload suspended therefrom, the pylon comprising:
  an attachment mechanism configured for facilitating mounting of the pylon to the aircraft wing; and
  a carrying arrangement configured for carrying the payload and being pivotally articulated to the attachment mechanism;
the pylon being configured to selectively pivot the carrying arrangement about a pylon axis between a vertical position in which it is suspended in a substantially vertical orientation, and a tilted position in which it is tilted toward the fuselage.

The carrying arrangement may comprise a housing defining an open-bottomed chamber therewithin, and a payload release unit for suspension therefrom of the payload, the payload release unit being configured to shift between an operational position in which it at least partially projects downwardly out of the housing, and a storage position in which it is fully received within the chamber.

The pylon may be configured to pivot the carrying arrangement from its vertical position to its tilted position when the payload release unit shifts from its operational position to its storage position.

The payload release unit may comprise one or more sway braces for attaching the payload thereto, each of the sway braces comprising a vertical bearing member and a laterally projecting carrying arm having a length which is larger than the width of the chamber, and wherein the carrying arms are external to the chamber when the payload release unit is in its operational position. This allows the housing to have a width which is smaller than the that of the sway braces, thereby reducing its profile and reducing the drag caused thereby during flight.

The pylon may be configured for facilitating rotation of the sway braces upon shifting of the payload release unit from its operational position to its storage position.

The payload release unit may comprise a support bar to which the sway braces are articulated, and a shifting arrangement configured actuate the support bar between raised and lowered positions. The shifting arrangement may comprise two parallelly arranged pivot links, each pivotally articulated at one end thereof to the housing, and at another end thereof to the support bar, the shifting arrangement further comprising an actuator configured to selectively pivot the pivot links. The actuator may be a linear actuator. The payload release unit may be configured to maintain the orientation of the support bar between its raised and lowered positions.

The payload release unit may be configured to mechanically facilitate pivoting of the carrying arrangement from its vertical to its tilted position when shifting from its operational to its storage position.

The attachment mechanism may define a receiving chamber therewithin, and an upper part of the carrying arrangement may comprise an suspension portion configured to be received within the receiving chamber and accommodated therein during pivoting of the carrying arrangement, the pylon axis passing through the receiving chamber and suspension portion.

The pylon may further comprise a gasket configured to provide a tight seal between the attachment mechanism and suspension portion at least when the carrying arrangement is in its vertical and tilted positions.

The carrying arrangement may further comprise a door configured, in a closed position thereof, to cover the open bottom of the chamber when the payload release unit is in its storage position, and, in an open position thereof, to allow the projection of the payload release unit from the chamber.

The door may be configured to pivot between the open and closed positions thereof about a door axis being substantially parallel to the pylon axis.

The door, in a fully open position thereof, may lie substantially in registration with a vertical outer surface of the housing.

The door may comprise biasing elements configured to bias the door towards its closed position.

The may further comprise a securing arrangement configured to secure the door in its open position.

The door, for example according to the option above wherein the pylon is configured for facilitating rotation of the sway braces upon shifting of the payload release unit from its operational position to its storage position, may be configured to facilitate the rotation of the sway braces upon closing. Accordingly, the door may comprise, on an interior surface thereof, a socket corresponding to each of the sway braces, each socket being configured to receive therein an end of the carrying arm of its corresponding sway brace, and to bear upon it in the direction of rotation as the door closes. Each of the sockets may be formed with an angled side wall for the bearing.

The pylon axis may be substantially parallel to a direction of flight of the aircraft (e.g., parallel to its roll axis).

The payload may be a munition, such as an air-to-surface missile.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1A:
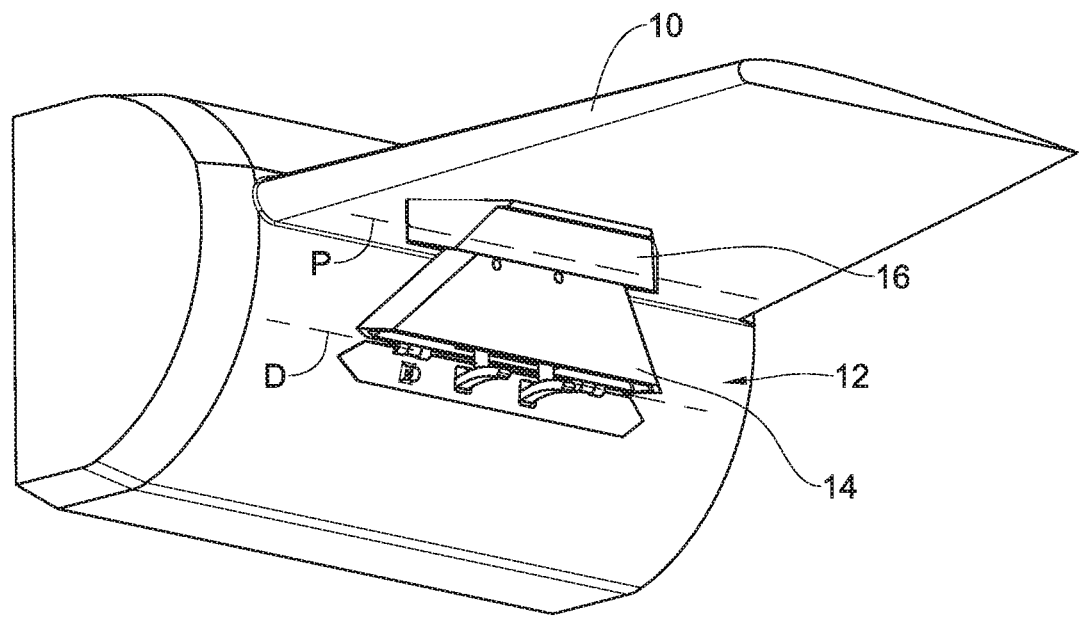
FIG. 1A is a bottom perspective view of part of an aircraft fuselage with a wing, and a pylon according to the presently disclosed subject matter mounted to an underside thereof.
Figure 1B:
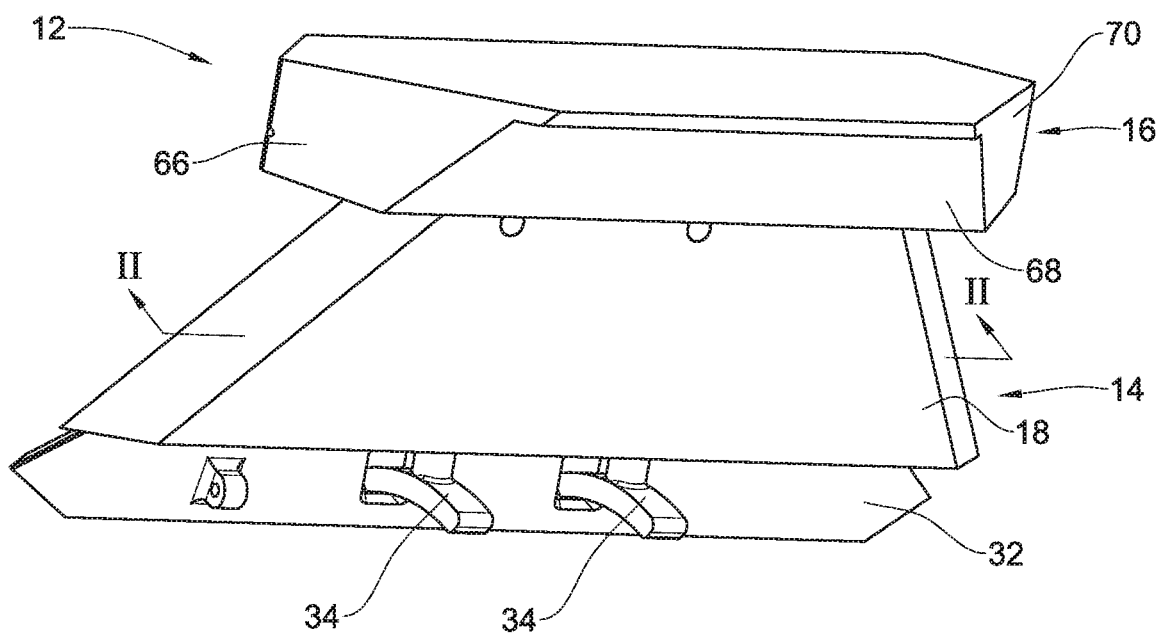
FIG. 1B is a top perspective view of the pylon illustrated in FIG. 1A, in an operative position.

As illustrated in FIGS. 1A and 1B, there is provided a wing 10 configured to be assembled onto the fuselage of an aircraft, and having a pylon 12 mounted to an underside thereof. The pylon is configured for carrying a payload (not illustrated) suspended therefrom, for example a munition such as a bomb (e.g., an air-to-surface missile or any other weapon suspended beneath the wing), an external fuel tank, electronics pod, etc.

The pylon 12 comprises a carrying arrangement 14, configured for carrying the payload, and an attachment mechanism 16, configured to be mounted to the underside of the wing 10 and facilitate suspension of the carrying arrangement therefrom.

It will be appreciated that herein the present disclosure and appended claims, terminology related to direction and/or orientation, such as up, down, vertical, front, rear, etc., and words related thereto, are to be understood as referring to the typical orientation of the pylon, in which it is disposed below the wing, with its front facing towards to direction of flight of the aircraft.

Figure 2A:
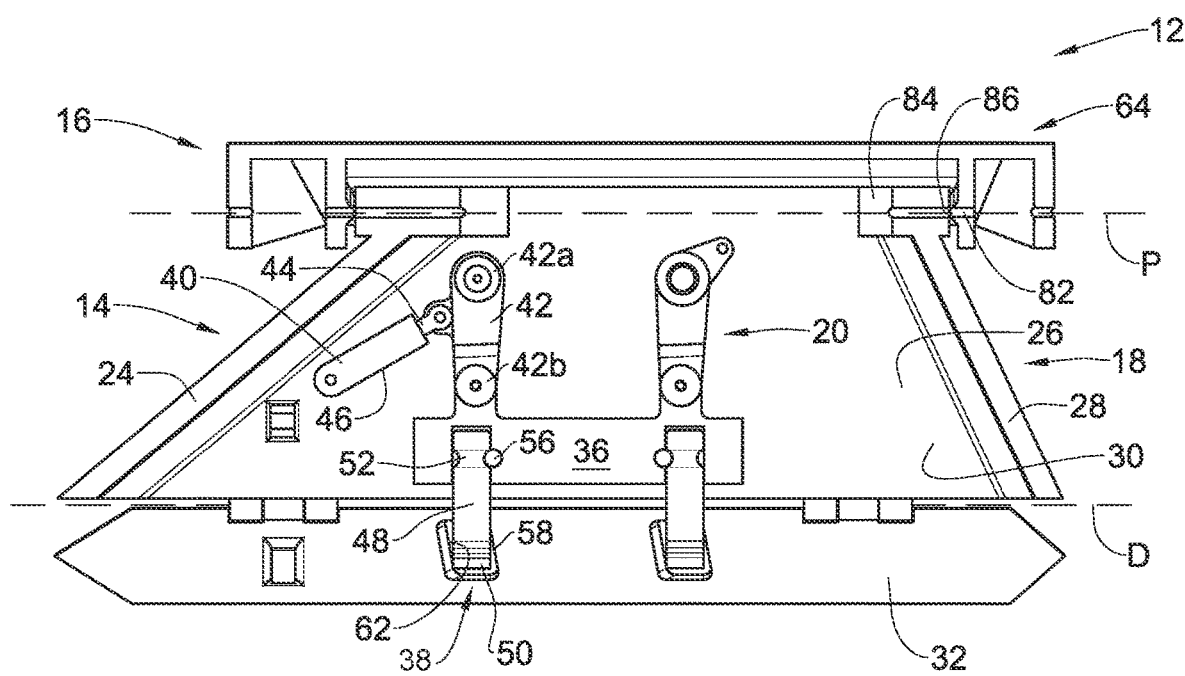
FIG. 2A is a cross-sectional view of the pylon, taken along line II-II in FIG. 1B.
Figure 2B:
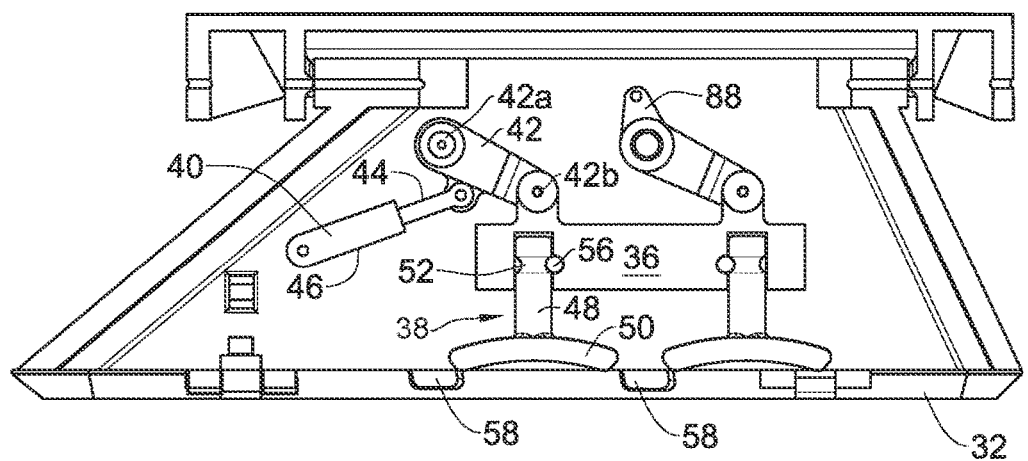
FIG. 2B is the cross-sectional view of 2A, in a storage position thereof.

As seen in FIGS. 2A and 2B, the carrying arrangement 14 comprises a housing 18 with a payload release unit 20 therewithin. The payload release unit 20 is configured to facilitate suspension and/or release of the payload therefrom, and is configured to be selectively shiftable between an operational position (illustrated in FIGS. 1A through 2A), in which it projects slightly below the bottom of the housing 18 (for example when carrying the payload), and a storage position, in which it is completely contained within the housing (e.g., after the payload is deployed; illustrated in FIG. 2B).

The housing 18 comprises front, side, and rear walls 24, 26, 28 defining a chamber 30 (in which the payload release unit is contained) therebetween. A door 32, hingedly attached, e.g., to a bottom edge of one of the side walls 26 and pivotable about door axis D, is provided. When the payload release unit 20 is in its operational position, the door 32 is open; when the payload release unit 20 is in its storage position, the door may be closed, as will be described herein below, thereby covering the open bottom side of the housing 18.

The cross-sectional shape of the housing 18 may be elongate in the direction of flight of the aircraft, i.e., the lengths of the side walls 26 may be substantially longer than those of the front and rear walls 24, 28. The front and/or rear walls 24, 28 may be formed so as to lower drag during flight, for example being formed with a chevron shape.

As mentioned, the payload release unit 20 is designed to facilitate suspension and/or release of the payload therefrom during flight of the aircraft. Accordingly, it may comprise two sway braces 34 articulated to a support bar 36, which is articulated to a shifting arrangement 38 is configured to facilitate raising and lowering the support bar 36, thereby shifting the payload release unit 20 between its operational and storage positions. It may thus comprise an actuator 40 and two pivot links 42. In addition, a controller (not illustrated) may be configured to direct operation of the actuator 40.

The pivot links 42 are pivotally articulated at top ends 42a thereof to, e.g., the housing 18, and at bottom ends 42b thereof to the support bar 36. According to the example described herein with reference to and illustrated in the accompanying drawing, a vertical orientation of the pivot links 42 is associated with the operational position of the payload release unit 20, and a tilted orientation thereof is associated with the storage position of the payload release unit. The actuator 40 is configured to pivot the pivot links 40, thereby moving the support bar vertically and facilitating the shifting between the two positions of the payload release unit 20. For example, the actuator 40 may comprise a vertical actuator having a piston rod 44 slidably displaceable within a piston housing 46, the piston housing being pivotally articulated to, e.g., the housing 18, and the piston rod being pivotally articulated to one of the pivot links 42.

As illustrated, the points of articulation of the pivot links 42 to the housing 18 and the support bar 36 may be arranged to define the vertices of a parallelogram, thereby ensuring that the support bar maintains its orientation with respect to the housing in the operational and storage positions of the payload release unit 20, as well as in all positions therebetween.

According to the configuration described above, the position of the actuator 40 in which its piston rod 44 is received within the piston housing 46 is associated with the operational position of the payload release unit 20. When the actuator 40 is operated to extend the piston rod 44 outwardly from the piston housing 46, the pivot link 42 to which it is articulated is pivoted about its top end 42a, thereby tilting it and causing the bottom end 42b thereof to move upwardly (as well as in the direction of extension of the piston rod). As the top ends 42a of both pivot links 42 are pivotally articulated to the housing 18, and the bottom ends 42b of both pivot links are pivotally articulated to the support bar 36, the movement of the pivot link by the actuator 40 causes both pivot links to tilt in tandem with one another, thereby raising the support bar upwardly within the chamber 30.

The sway braces 34 are configured to directly carry the payload. Accordingly, each comprises a vertical bearing member 48 and a carrying arm 50 at a bottom end thereof, for example unitarily formed. The carrying arm 50 may be provided according to any suitable design known in the art, or any other suitable design. It may be formed so as to curve downwardly, for example to conform to the shape of the payload.

In addition, the sway braces 34 may be configured so as to freely rotate within the support bar 36. According to some examples, the vertical bearing member 48 has circular cross section with a circumferential groove 52 formed near a top end thereof. The support bar 36 is formed with two downwardly-facing apertures 54 each configured to receive therein the vertical bearing member. One or more rolling elements 56, e.g., having a cylindrical or spherical shape, and sized so as be received and freely rotate within the circumferential groove 52, is provided within each of the apertures 54 within the groove to facilitate free rotation of the sway brace 34 therewithin.

Accordingly, the width of the carrying arms 50 of the sway braces 34 may be larger than the width (the distance between the side walls 26) of the chamber 30 defined by the housing 18 (i.e., the housing 18 may be designed to have a smaller width than that required of the sway braces when carrying a payload). In the operational position of the payload release unit 20, the carrying arms 50 are located below the chamber 30 defined by the housing 18, and may thus extend beyond its width; in the storage position of the payload release unit, the sway braces 34 may rotate such that the carrying arms are substantially aligned along the length (the dimension spanning between the front and rear walls 24, 28) of the housing. This allows for a slimmer housing 18 than would be possible if the sway braces 34 were not rotatable, which may contribute to a more aerodynamic design of the pylon.

The door 32 of the housing 18 may be configured to facilitate the rotation of the sway braces 34 toward their orientation in which the carrying arms 50 are substantially aligned along the length of the housing. As the door axis D is aligned substantially parallel to the length of the housing 18, the direction in which it rotates upon closing is substantially perpendicular to the direction of the carrying arms 50 of the sway braces. Sockets 58 may be provided on an inner surface of the door 32, each disposed in a location corresponding to one of the carrying arms 50. Side walls 62 of the sockets 58 are formed at an angle. When the door 32 closes, an end of each carrying arm 50 is received within a socket 58. Upon further closing of the door 32, the end of each carrying arm 50 slides up the side wall 62 of its corresponding socket 58. Owing to the angle of the side wall 62, the carrying arm 50 is borne upon in the direction of rotation of the sway brace 34, i.e., it is pushed toward the front or back of the housing (depending on the design of the socket 58), thereby facilitating rotation about its vertical bearing member 48. Accordingly, closing the door 32 while the payload release unit 20 is being brought from its operational position to its storage position also rotates the sway braces such that their carrying arms 50 are substantially aligned along the length of the housing 18.

The door 32 is configured to be rotated about the door axis D sufficiently such that it does not interfere with the sway braces 34 when the payload release unit 20 is in its operational position. For example, the door 32 may be rotated at least 180° when opened. According to some examples (not illustrated), the door 32 is configured to rotate until it lies in registration against an outer surface of the side wall 26 to which it is attached, e.g., rotated substantially 270° from its closed position to its fully open position. A securing arrangement (not illustrated) may be provided to selectively secure the door 32 in it opened position. According to some examples, biasing elements (not illustrated), such as torsion springs, are provided to impart a force to door 32 to close. In order to close the door 32, the securing arrangement may disengage, allowing the biasing elements to bring the door towards its closed position. It will be appreciated that any other suitable mechanism may be provided to close the door 32. For example, an explosive charge powerful enough to move the door 32, but not so much so as to cause damage to the housing 18, may be disposed between the door and the housing and selectively activated to provide the force necessary to close the door.

Figure 3A:
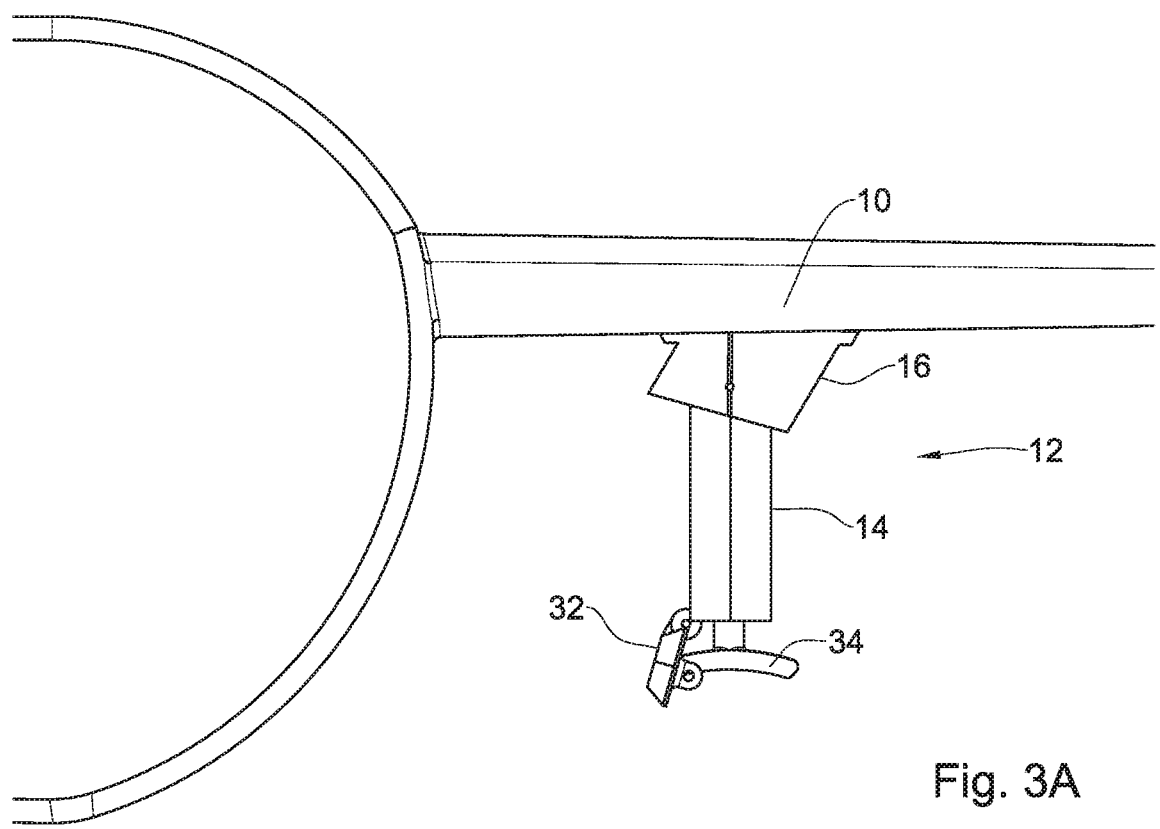
FIGS. 3A and 3C are front views of the pylon illustrated in FIG. 1A in, respectively, a vertical position and a tilted position thereof.
Figure 3B:
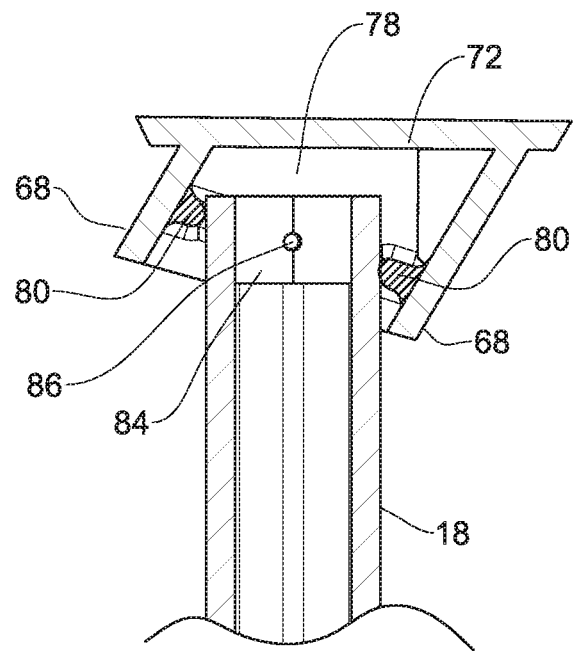
FIGS. 3B and 3D are, respectively, close-up sectional views of a top portion of the pylon as illustrated, respectively, in FIGS. 3A and 3C.
Figure 3C:
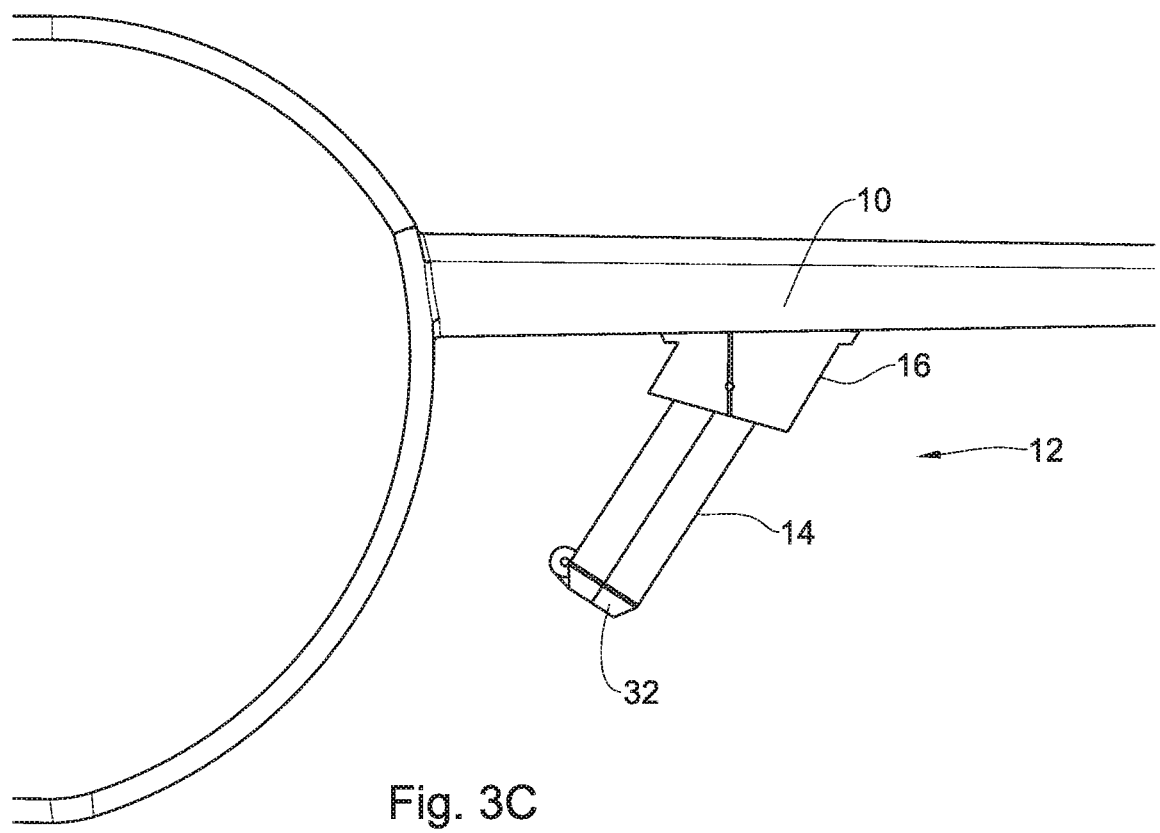
Figure 3D:
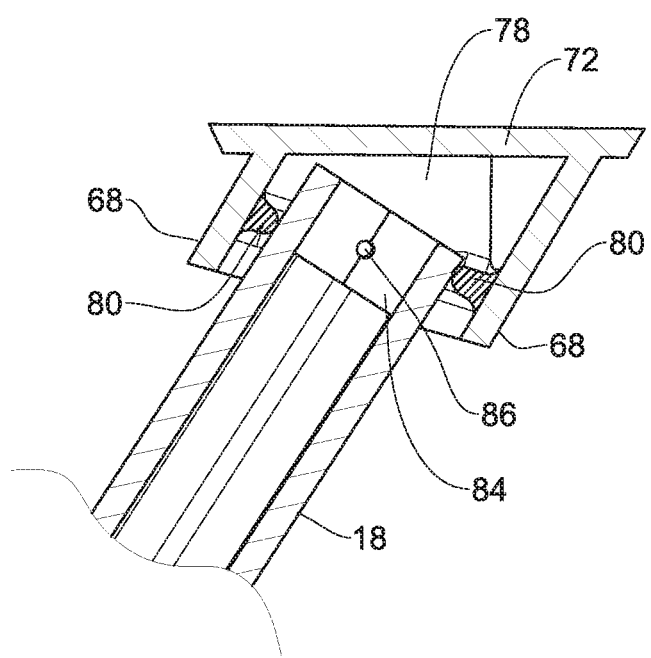

The top portion of the housing 18 and the attachment mechanism are formed with cooperating elements of a hanging arrangement, which is generally indicated at 64. The hanging arrangement is configured to facilitate pivotally articulating the carrying arrangement 14 to the attachment mechanism 16, such that the housing 18 may rotate about a pylon axis P which is aligned in substantially the same direction that the length of the housing extends, i.e., in the direction of flight of the aircraft, such that the housing may pivot toward or away from the fuselage. According to some examples, the rotation is limited to a range between a substantially vertical position of the carrying arrangement 14 as illustrated in FIGS. 3A and 3B (e.g., being suspended substantially perpendicularly from the bottom of the wing in the case of a wing which is parallel to the ground, or, in the case of a vertically-angled wing, suspended such that it is substantially perpendicular to the ground; i.e., it is suspended substantially parallel to the yaw angle of the aircraft), and a tilted position as illustrated in FIGS. 3C and 3D in which the carrying arrangement is tilted toward the fuselage. The vertical position may be associated with the operational position of the payload release unit 20 of the carrying arrangement 14, and the tilted position may be associated with the storage position of the payload release unit. Tilting the pylon 12 toward the fuselage as shown may mitigate the aerodynamic effect thereof on the aircraft during flight.

Figure 4:
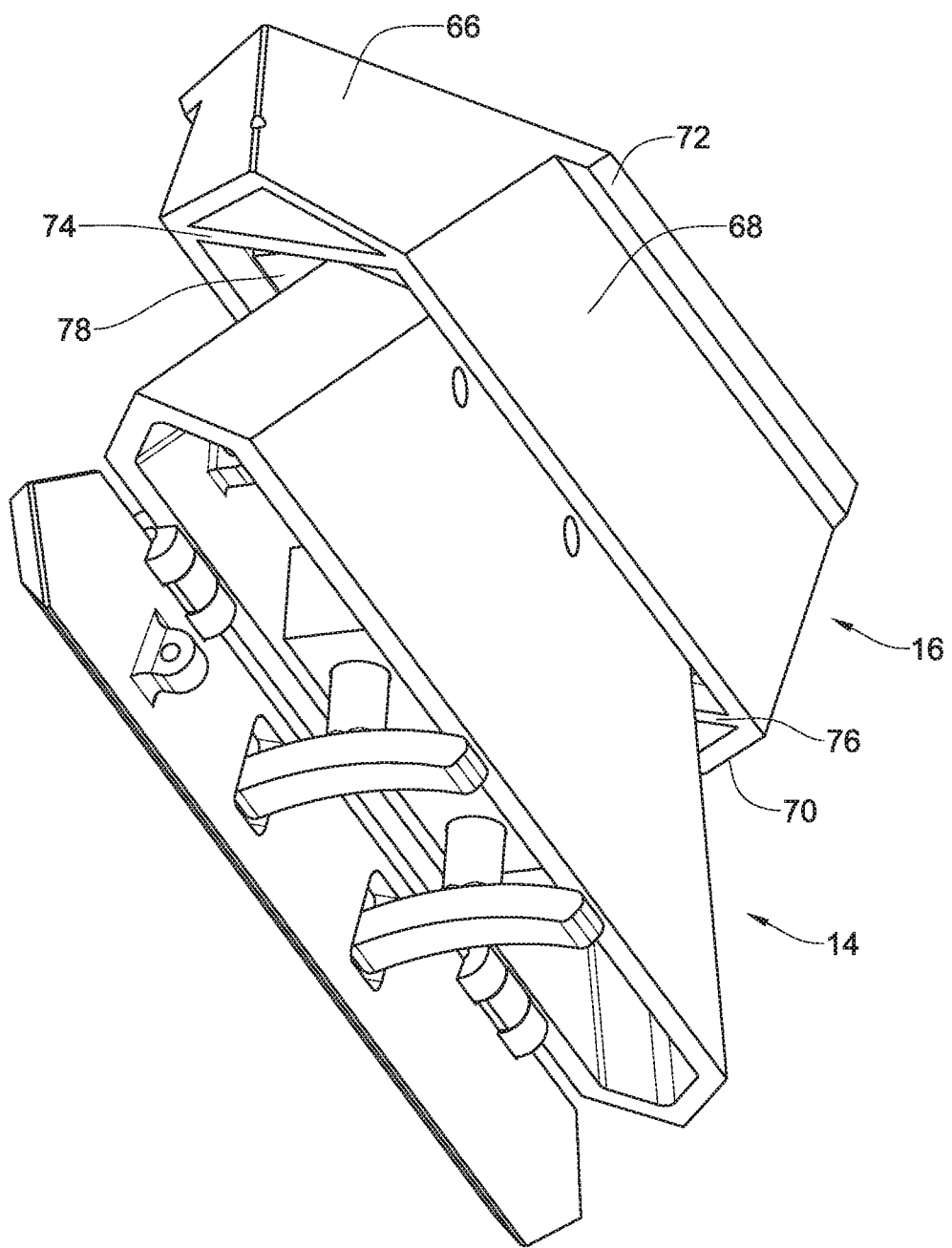
FIG. 4 is a lower perspective view of the pylon illustrated in FIG. 1A.

As best seen in FIG. 4, the attachment mechanism 16 comprises a plurality of walls, e.g., front, side, and rear wall 66, 68, 70, projecting downwardly from a mounting plate 72 which is configured to be rigidly attached to the underside of the wing 10 to facilitate mounting of the pylon 12 thereon. The attachment may be accomplished by any suitable method, for example as known in the art.

The design of the attachment mechanism 16 may be similar to that of the housing 18, i.e., having a cross-sectional shape which is elongate in the direction of flight of the aircraft, i.e., the lengths of the side walls 68 may be substantially longer than those of the front and rear walls 66, 70. The front and/or rear walls 66, 70 may be formed so as to contribute to a more aerodynamic design, e.g., to lower drag during flight, for example being formed with a chevron shape. In addition, the side walls 68 of the attachment mechanism 16 may project from the mounting plate 72 at an angle thereto, for example toward the fuselage of the aircraft.

Front and rear interior partitions 74, 76 may be provided on an interior side of, respectively, each of the front and rear walls 66, 70 of the mechanism 16. The interior partitions 74, 76 have straight inner surfaces facing and substantially parallel to one another, and substantially perpendicular to the pylon axis P and parallel to one another. They may be separate from the front and rear walls 66, 70 as shown, or formed therewith, i.e., the front and/or rear walls may be formed with an outer surface designed with aerodynamic considerations, and a straight inner surface constituting one of the partitions 74, 76. The partitions 74, 76 and side walls 68 define a receiving chamber 78 therebetween, for receipt therein of a top portion of the carrying arrangement 14, as will be described below. A gasket 80 may be provided around the inner perimeter of the receiving chamber 78. In addition, through-going apertures 82 are provided through the front and rear walls 66, 70 and partitions 74, 76. The apertures are coaxially aligned with each other, and are formed extending along the pylon axis H.

The upper part of the housing 18 (i.e., above the walls 24, 26, 28 thereof) is formed with a suspension portion 84 at its top end, which constitutes part of the hanging arrangement 64. The suspension portion 84 is formed with a substantially rectangular external cross-section, sized so as to fit within the receiving chamber 78 of the attachment mechanism 16. According to examples wherein the receiving chamber 78 is provided with a gasket 80, the external cross-section of the suspension portion 84 is sized so as to fit snuggly therewithin. Through-going apertures 86, coaxially arranged with each other and extending along the pylon axis H, are formed in the suspension portion 84. A pivot rod (not illustrated), constituting part of the hanging arrangement 64, is provided passing through the apertures 82, 86, facilitating the pivotally articulating the carrying arrangement 14 to the attachment mechanism 16. The gasket 80 may be selected such that it provides a tight seal between the attachment mechanism 16 and the suspension portion 84 in the vertical and tilted positions thereof. It may further provide a tight seal therebetween at positions between the vertical and tilted position.

The pylon 12 may be configured such that the carrying arrangement 14 remains in its vertical position when the payload release unit 20 is in its operational position, and to pivot about pylon axis H to its tilted position when the payload release unit shifts to its storage position, for example after the payload is deployed. This may be accomplished by provided an actuator (not illustrated) to facilitate tilting of the carrying arrangement, and a controller configured to coordinate shifting of the carrying arrangement between its two positions and pivoting of the carrying arrangement between its two positions. The controller may also be configured to coordinate operation of the door 32 of the housing 18, and or to detect/direct deployment of the payload.

Alternatively or in addition, the payload release unit 20 may be configured to mechanically facilitate pivoting of the carrying arrangement 14 from its vertical position to its tilted position, e.g., when shifting from its operational position to its storage position, according to any suitable mechanical arrangement. For example, one of the pivot links 42 may comprise an arrangement 88 for connection thereto of a cam member (not illustrated), which may extend upwardly and move with the payload release unit 20 when shifting between its two positions. The suspension portion 84 and/or attachment mechanism 16 may be formed with a corresponding follower arrangement. The cam member and follower arrangement are co-configured such that the movement of the cam member, during shifting of the payload release unit 20 from its operational to storage positions, cooperates with the follower arrangement to pivot the carrying arrangement 14 from its vertical to its tilted positions.

Those skilled in the art to which this invention pertains will readily appreciate that numerous changes, variations, and modifications can be made without departing from the scope of the presently disclosed subject matter, mutatis mutandis.

The invention claimed is:

1. An aircraft pylon for mounting to the underside of an aircraft wing projecting from a fuselage and for carrying an external payload suspended therefrom, the aircraft pylon comprising:
   an attachment mechanism configured for facilitating mounting of the pylon to the aircraft wing; and
   a carrying arrangement configured for carrying said payload and being pivotally articulated to said attachment mechanism, the carrying arrangement including a housing defining an open-bottomed chamber therewithin and a payload release unit for suspension therefrom of said payload, the payload release unit being configured to shift between an operational position in which the payload release unit at least partially projects downwardly out of the housing, and a storage position in which the payload release unit is fully received within the chamber;
   said aircraft pylon being configured, when the payload release unit shifts from the operational position to the storage position, to pivot said carrying arrangement about a pylon axis between a vertical position in which it is suspended in a substantially vertical orientation, and a tilted position in which it is tilted toward said fuselage.

2. The aircraft pylon according to claim 1, wherein said payload release unit comprises one or more sway braces for attaching the payload thereto, each of said sway braces comprising a vertical bearing member and a laterally projecting carrying arm having a length which is larger than the width of said chamber, and wherein said carrying arms are external to the chamber when the payload release unit is in its operational position.

3. The aircraft pylon according to claim 2, configured for facilitating rotation of said sway braces upon shifting of the payload release unit from its operational position to its storage position.

4. The aircraft pylon according to claim 2, wherein said payload release unit comprises a support bar to which said sway braces are articulated, and a shifting arrangement configured to actuate the support bar between raised and lowered positions.

5. The aircraft pylon according to claim 4, said shifting arrangement comprising two parallely arranged pivot links, each pivotally articulated at one end thereof to the housing, and at another end thereof to the support bar, the shifting arrangement further comprising an actuator configured to selectively pivot said pivot links.

6. The aircraft pylon according to claim 5, wherein said actuator is a linear actuator.

7. The aircraft pylon according to claim 5, said payload release unit being configured to maintain the orientation of said support bar between its raised and lowered positions.

8. The aircraft pylon according to claim 1, wherein said payload release unit is configured to mechanically facilitate pivoting of the carrying arrangement from its vertical to its tilted position when shifting from its operational to its storage position.

9. The aircraft pylon according to claim 1, said attachment mechanism defining a receiving chamber therewithin, an upper part of said carrying arrangement comprising a suspension portion configured to be received within said receiving chamber and accommodated therein during pivoting of the carrying arrangement, said pylon axis passing through said receiving chamber and suspension portion.

10. The aircraft pylon according to claim 9, further comprising a gasket configured to provide a tight seal between said attachment mechanism and suspension portion at least when said carrying arrangement is in its vertical and tilted positions.

11. The aircraft pylon according to claim 1, wherein said carrying arrangement further comprises a door configured, in a closed position thereof, to cover the open bottom of said chamber when the payload release unit is in its storage position, and, in an open position thereof, to allow the projection of the payload release unit from the chamber.

12. The aircraft pylon according to claim 11, wherein said door is configured to pivot between said open and closed positions thereof about a door axis being substantially parallel to said pylon axis.

13. The aircraft pylon according to claim 12, wherein said door, in a fully open position thereof, lies substantially in registration with a vertical outer surface of said housing.

14. The aircraft pylon according to claim 11, wherein said door comprises biasing elements configured to bias said door towards its closed position.

15. The aircraft pylon according to claim 14, further comprising a securing arrangement configured to secure the door in its open position.

16. The aircraft pylon according to claim 11, wherein said payload release unit includes one or more sway braces for attaching the payload thereto, each of said sway braces comprising a vertical bearing member and a laterally projecting carrying arm having a length which is larger than the width of said chamber, said carrying arms being external to the chamber when the payload release unit is in its operational position, the pylon being configured for facilitating rotation of said sway braces upon shifting of the payload release unit from the operational position to the storage position, wherein said door is configured to facilitate the rotation of the sway braces upon closing.

17. The aircraft pylon according to claim 16, wherein said door comprises, on an interior surface thereof, a socket corresponding to each of the sway braces, each socket being configured to receive therein an end of the carrying arm of its corresponding sway brace, and to bear upon it in the direction of rotation as the door closes.

18. The aircraft pylon according to claim 17, wherein each of said sockets is formed with an angled side wall for the bearing.

19. The aircraft pylon according to claim 1, wherein said pylon axis is substantially parallel to a direction of flight of the aircraft.

\* \* \* \* \*